United States Patent [19]
Agajanian et al.

[11] Patent Number: 5,881,973
[45] Date of Patent: Mar. 16, 1999

[54] PASSENGER DOOR OPERATION CONTROL SET

[75] Inventors: Dale Richard Agajanian, Montebello; William Clement Topf, Orange, both of Calif.

[73] Assignee: McDonnell Douglas Corporation, Huntington Beach, Calif.

[21] Appl. No.: 946,724

[22] Filed: Oct. 8, 1997

Related U.S. Application Data

[63] Continuation of Ser. No. 707,668, Sep. 4, 1996, abandoned.

[51] Int. Cl.⁶ .............................. B64C 1/14; B64C 1/22; B64D 9/00
[52] U.S. Cl. .................................... 244/129.5; 244/137.1
[58] Field of Search ............................ 244/118.1, 129.3, 244/129.4, 137.1; 49/24, 31; 200/61.62; 705/348

[56] References Cited

U.S. PATENT DOCUMENTS

| | | | |
|---|---|---|---|
| 2,441,367 | 5/1948 | Noville | 244/137.1 |
| 3,478,904 | 11/1969 | Courter . | |
| 3,552,587 | 1/1971 | Warren . | |
| 3,776,492 | 12/1973 | Iben . | |
| 3,873,177 | 3/1975 | Ross . | |
| 3,885,685 | 5/1975 | Montgomery et al. . | |
| 3,958,165 | 5/1976 | Boy De La Tour | 244/137.1 |
| 3,972,427 | 8/1976 | Stanley et al. . | |
| 4,483,499 | 11/1984 | Fronk . | |
| 5,251,851 | 10/1993 | Hermann et al. | 244/129.5 |
| 5,421,531 | 6/1995 | Carducci . | |
| 5,421,539 | 6/1995 | Carducci . | |
| 5,508,687 | 4/1996 | Gebhardt et al. | 340/825.31 |
| 5,588,506 | 12/1996 | Born | 187/209 |
| 5,828,316 | 10/1998 | DiCroce | 340/825.69 |

FOREIGN PATENT DOCUMENTS

| | | | |
|---|---|---|---|
| 0656278 | 1/1980 | U.S.S.R. | 244/129.5 |
| 8401404 | 4/1984 | WIPO | 244/129.5 |

*Primary Examiner*—Virna Lissi Mojica
*Attorney, Agent, or Firm*—Alston & Bird LLP

[57] ABSTRACT

A passenger door control set simulates the electrical sequencing and control circuits that controls the operation of an aircraft's passenger doors, allowing the door to be opened and/or closed, and substitutes for the normal sequencing and control circuits that were removed from the aircraft during its conversion to a freighter configuration. The set contains a portable equipment box and a portable door switch box, and a set of adapter cables in a kit. The equipment box is connected by selected cables to the overhead equipment panel connectors and the door switch box is connected to the door bulkhead connectors for the selected aircraft door. Indicators are provided at each box to perceptibly indicate the correctness of the hook up and availability of electrical power.

16 Claims, 4 Drawing Sheets

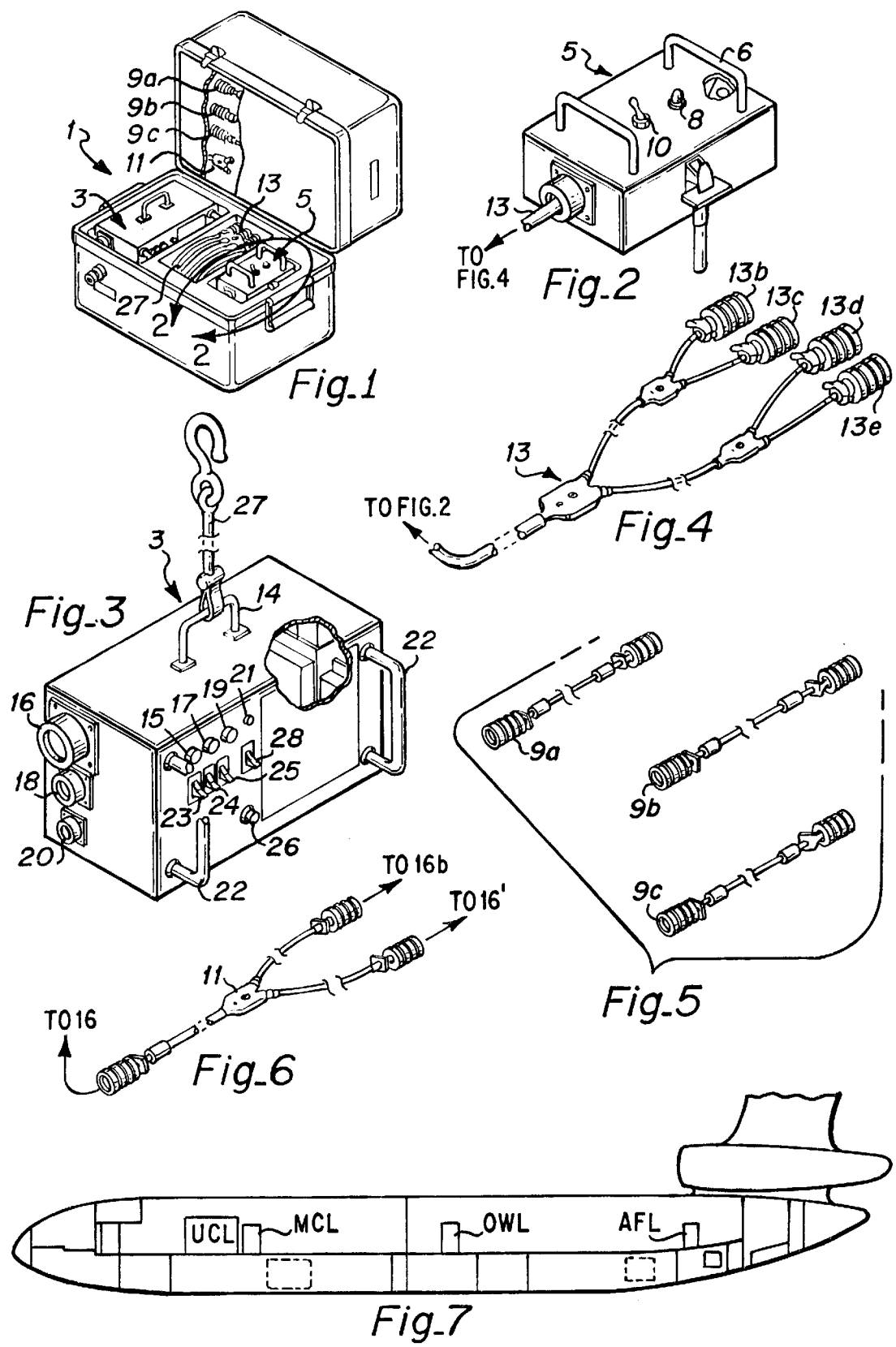

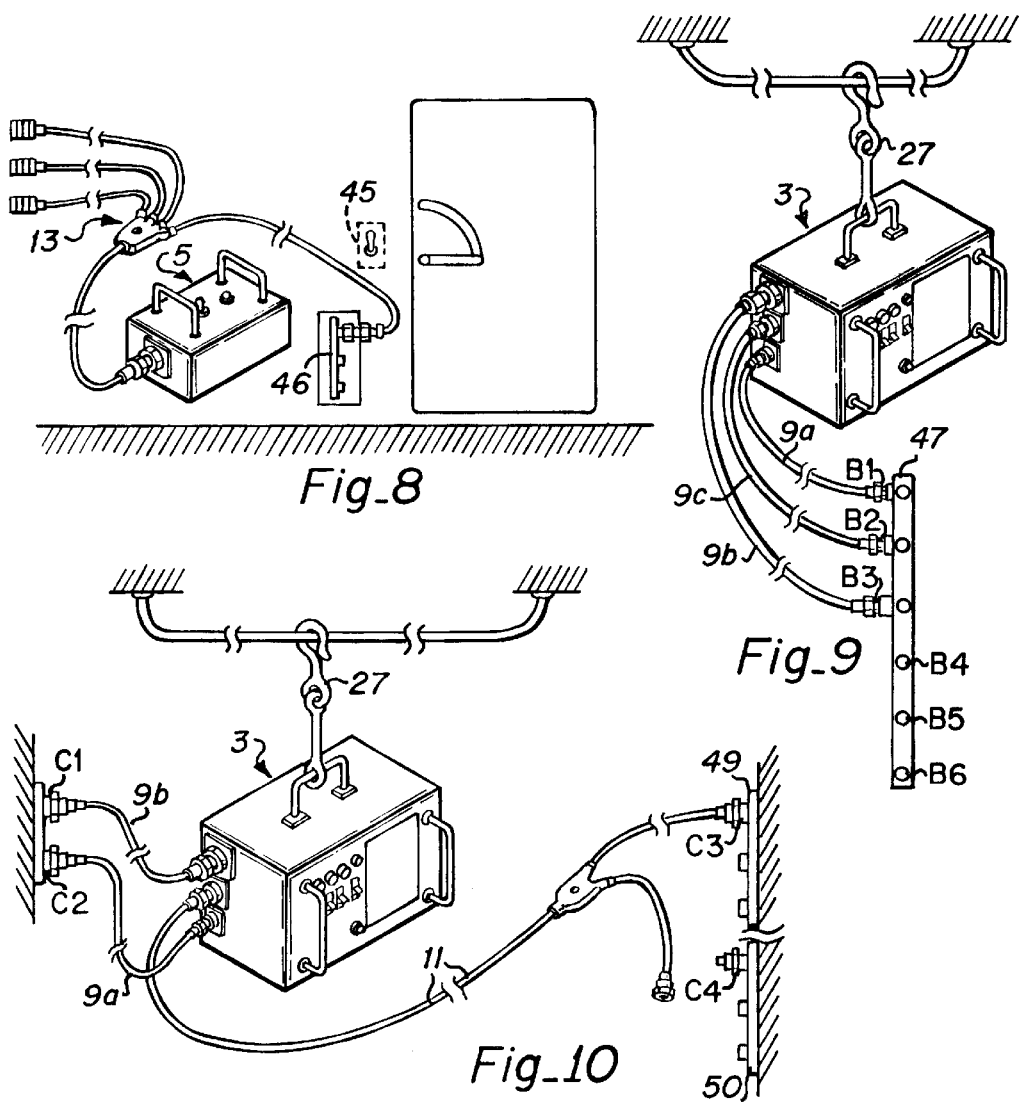

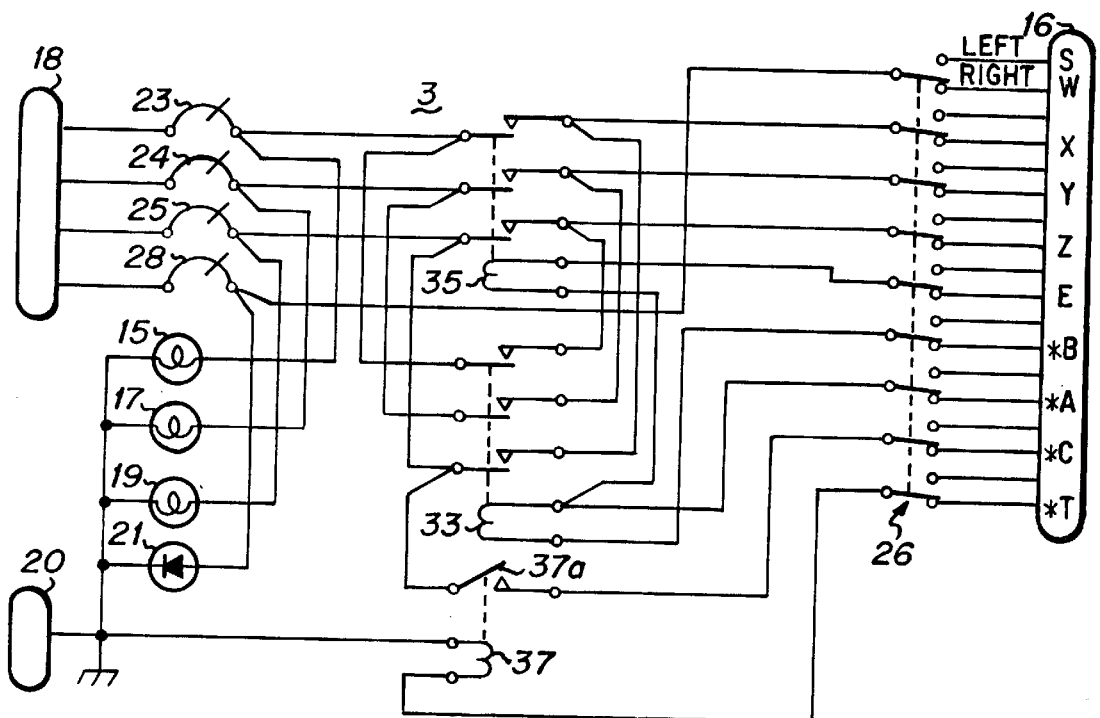
Fig_11
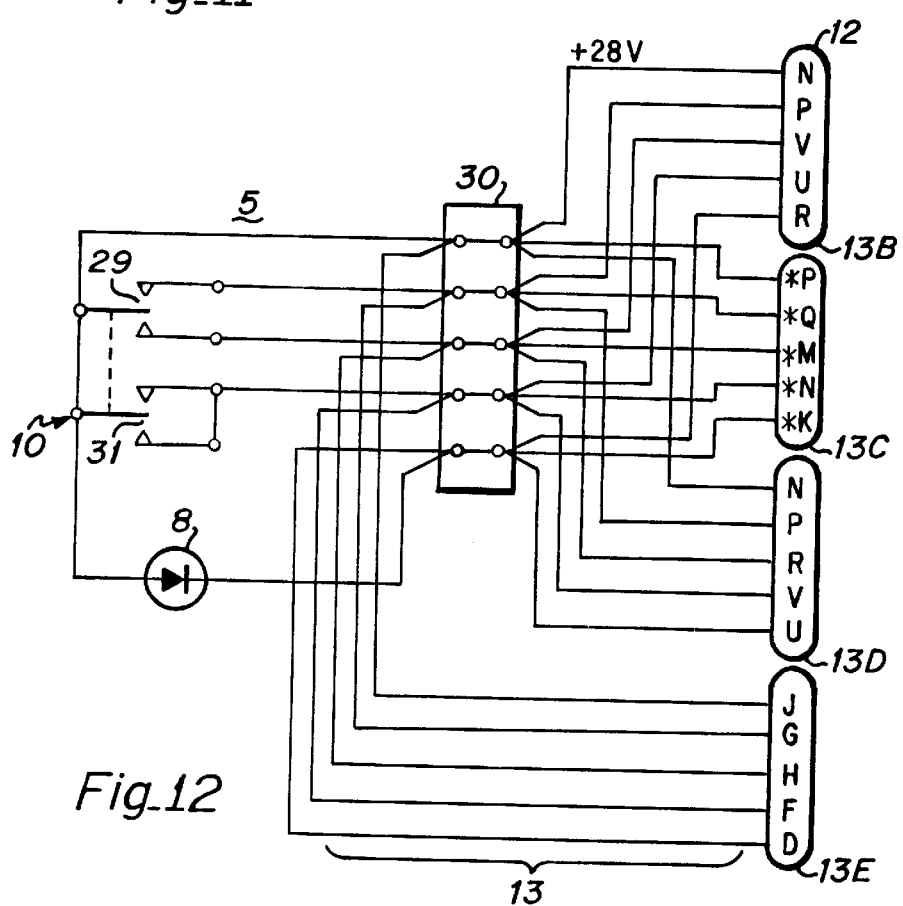
Fig_12

PASSENGER DOOR OPERATION CONTROL SET

This application is a continuation of application Ser. No. 08/707,668, filed Sep. 4, 1996, now abandoned.

FIELD OF THE INVENTION

This invention relates to aircraft passenger door controls and, more particularly, to a portable control set for operating the passenger doors when the attendant's door controls are unavailable, such as occurs when the aircraft is being employed as a freighter.

BACKGROUND

Certain aircraft are convertible. They have multiple configurations; one configuration for transporting passengers and another alternative configuration for transporting freight. Such aircraft is converted from one configuration to the other in short time to obvious advantage. Convertibility allows the aircraft to be more fully utilized, essentially around the clock in one configuration or another as needed to meet the demands of the transportation marketplace. One such convertible aircraft, as example, is the McDonnell Douglas MD-11 aircraft.

As is familiar to those boarding an aircraft to obtain passenger service, the aircraft contains rows of seats for seating passengers, paneling on the side walls, a ceiling, overhead compartments, a galley, flight attendant's control panel, and all other accouterments of the passenger configuration. One also finds passenger doors located on each side of the aircraft's rear through which the passenger may embark, and debark the airplane. The freighter configuration, however, is not too familiar, if at all, to the lay person. When the passenger period is complete, the craft may be used for freight shipments for another period of time and it is converted to the freighter configuration. The passenger seats are removed; the ceiling, wall paneling, and cooking galley are removed; and the overhead equipment control panels and the attendant's passenger door control switches are removed, and cargo rollers are installed over the floor to yield a large hollow shell for warehousing freight.

Freight carried on pallets is introduced through the aircraft's freight door, a door located at the front of the plane that is rarely seen by or even known to most passengers. Those loaded pallets are pushed to the rear of the plane. Additional loaded pallets follow and are positioned along side, continuing until the plane's cabin is completely filled with freight. As is apparent, when the craft is in the freighter configuration there seems little need to use any passenger doors. The removal of the flight attendant's passenger door control switches and associated circuit breakers located in the passenger cabin, that allowed a flight attendant to open and close the passenger doors during passenger configuration, until now, seemed of no material consequence.

Should one wish to access the aircraft through the passenger door while in the freight configuration, the door may be opened with an emergency air bottle. However, use of the air bottle is not routine and is impractical. The air bottle is an emergency tool designed for "one time" operation, and it only opens a single door. Hence, its use for routine door operation is not practical.

One also might wish to raise and lower the passenger door attendant to converting the aircraft from the passenger configuration to the freight configuration. As example in some recent aircraft decorating arrangements, one finds that although the passenger accouterments and the flight attendant's passenger door control switches may be removed, it is not possible to remove the trim around the passenger door frame without first opening the passenger door. In such a situation the airline personnel are faced with a "catch 22" situation. They cannot remove some parts of the craft's interior if the door is in its raised, that is, open position, and cannot remove the door trim if the door is in its closed position. Such a situation would require complex maneuvering by those airline personnel charged with transforming the aircraft's configuration that is both time consuming and requires undertaking a non-traditional procedure. The desire remains to strip the passenger cabin of the passenger accouterments so that the cargo can be loaded.

The door could be forced open using several strong persons, but that is not a safe method. Or the flight attendant's door control switches and the associated overhead equipment panels, removed during the re-configuration procedure can be replaced, operated to raise the door, the door trim removed, the door lowered again, and the flight attendant's switches and overhead equipment panels removed again, a second time. In the MD-11 aircraft, as example, approximately three and one-half hours is required to re-install and then remove those flight attendant passenger door switches. Such is a time consuming procedure, that not only increases operational costs, but could result in unintended delays in flying the aircraft. A need thus exists in such limited circumstances for an alternative method of operating the aircraft's motorized passenger doors without the necessity of reinstalling the flight attendant's control panel and overhead equipment panel.

An object of the invention therefore is to provide a novel passenger door control apparatus that emulates the functions of a flight attendant's control panel and the associated equipment panel.

A further object of the invention to provide a portable easily transportable electrical apparatus that may be temporarily installed, quickly and easily, aboard aircraft to permit operation of the passenger doors when the aircraft is in the freight configuration.

As an example, the Md-11 convertible freighter aircraft may be changed in configuration to transport passengers or to transport freight. The passenger doors on that craft are electrically operated and contain a number of safety mechanisms to ensure that the door is not damaged by the opening and closing movements. A release solenoid is provided that essentially locks the door in place, preventing unintended door movement. Before the door can be either raised or lowered, the release solenoid must first be operated to unlock the door. To open, the door is elevated or raised by means of an electrically controlled motor mechanism. To close, the electrical motor mechanism, lowers the door. Additionally, position limit switches are properly positioned relative to the door to break the electrical power circuit to the motor when the door attains a prescribed limit position during each of the opening and closing operations. Those limit switches prevent the door from moving past the prescribed limit positions during either opening or closing.

For freighter configuration the cabin attendant door control panel and overhead circuit breaker equipment panels that contain the number 2 and 3 left and right passenger door control circuits are removed to make room for cargo. The removal of that equipment and control renders the number 2 and 3 passenger doors inoperative.

The respective passenger door motor, open/close limit switches, and release solenoids, which remain in place in both aircraft configurations, require electrical power and proper operational sequencing to operate the electric motor driven cable mechanism to raise and/or lower the door. The motor driven cable mechanism pulls the door up a track to a position above the door opening in the side of the aircraft, the door open position; and lowers the door down the track to the door closed position.

A specific object of the invention, thus, is to permit passenger door operation of an Md-11 aircraft when the aircraft is in the freighter configuration while retaining the safety features provided by the door's upper and lower position limit switches.

SUMMARY OF THE INVENTION

In accordance with the foregoing objects, the passenger door control set of the present invention is a kit that comprises a control box assembly, an attendant box assembly, and an assortment of electrical cables that tie into the aircraft's door control circuits and electrical power circuits.

The control box connects to the aircraft's door control circuit breaker panel disconnect bulkhead connectors to selectively interface with the selected left or right number two or number three passenger door motor, lock release solenoid, and limit switches, which have an electrical interface connector located high overhead, approximately nine feet above the cabin floor, near the respective pair or right and left passenger doors. The control box mounted in the elevated position is hung from brackets attached to the cabin fuselage.

The attendant box connects to the attendant door control panel disconnect bulkhead connectors located near the floor by the selected passenger door and emulates the absent attendant's door control switch. The attendant box interacts with the control box through the craft's wiring and contains, among other elements, a selector switch to allow the operator to signal to the control box to commence the sequence that opens or closes the passenger door.

The passenger door control set controls the door operation and sequences the operation in the same manner as the control circuits that were removed in converting to the freighter configuration. As an advantage, the control set utilizes the existing door limit switches, release lock switch and door drive motor mechanism that remain in the aircraft during freighter configuration; and does not require any modification to the aircraft. The control set is light weight and portable. It is easily installed for use when the aircraft is on the ground and can quickly be removed and stowed for aircraft flight.

The foregoing and additional objects and advantages of the invention together with the structure characteristic thereof, which was only briefly summarized in the foregoing passages, becomes more apparent to those skilled in the art upon reading the detailed description of a preferred embodiment, which follows in this specification, taken together with the illustration thereof presented in the accompanying drawings.

BRIEF DESCRIPTION OF THE DRAWINGS

In the drawings:

FIG. 1 pictorially illustrates the various components to the novel passenger door control set as packaged in a lidded container for storage and transport;

FIG. 2 is a pictorial of the door control set's attendant box in greater scale;

FIG. 3 is a pictorial view of the door control set's control box in greater scale;

FIG. 4 illustrates the attendants box multi-door adapter cable assembly used to connect the control box of FIG. 2 to a selected passenger door attendant's door bulkhead connector associated with any of an aircraft's two pairs of left and right side passenger doors;

FIG. 5 shows the three cable assemblies that attach to the equipment box of FIG. 3 and to mating connectors in the aircraft's equipment panel;

FIG. 6 pictorially illustrates the cable assembly for connection between the control set control box of FIG. 3 and to a selected one of the left or right passenger doors;

FIG. 7 is an outline drawing of an aircraft showing exemplary door locations;

FIG. 8 is a pictorial showing the adapter cable connection of the attendant box to the one passenger door attendant bulkhead connector;

FIG. 9 is a pictorial showing the connection of the control box to the overhead equipment panel connectors for the right and left No. 2 passenger doors;

FIG. 10 is a pictorial showing the same connection for the right and left No. 3 passenger doors;

FIG. 11 is a schematic diagram of the control box of FIG. 3 and FIG. 12 is a schematic diagram of the attendant box of FIG. 2 associated therewith.

DETAILED DESCRIPTION OF THE PREFERRED EMBODIMENTS

Figure 13:
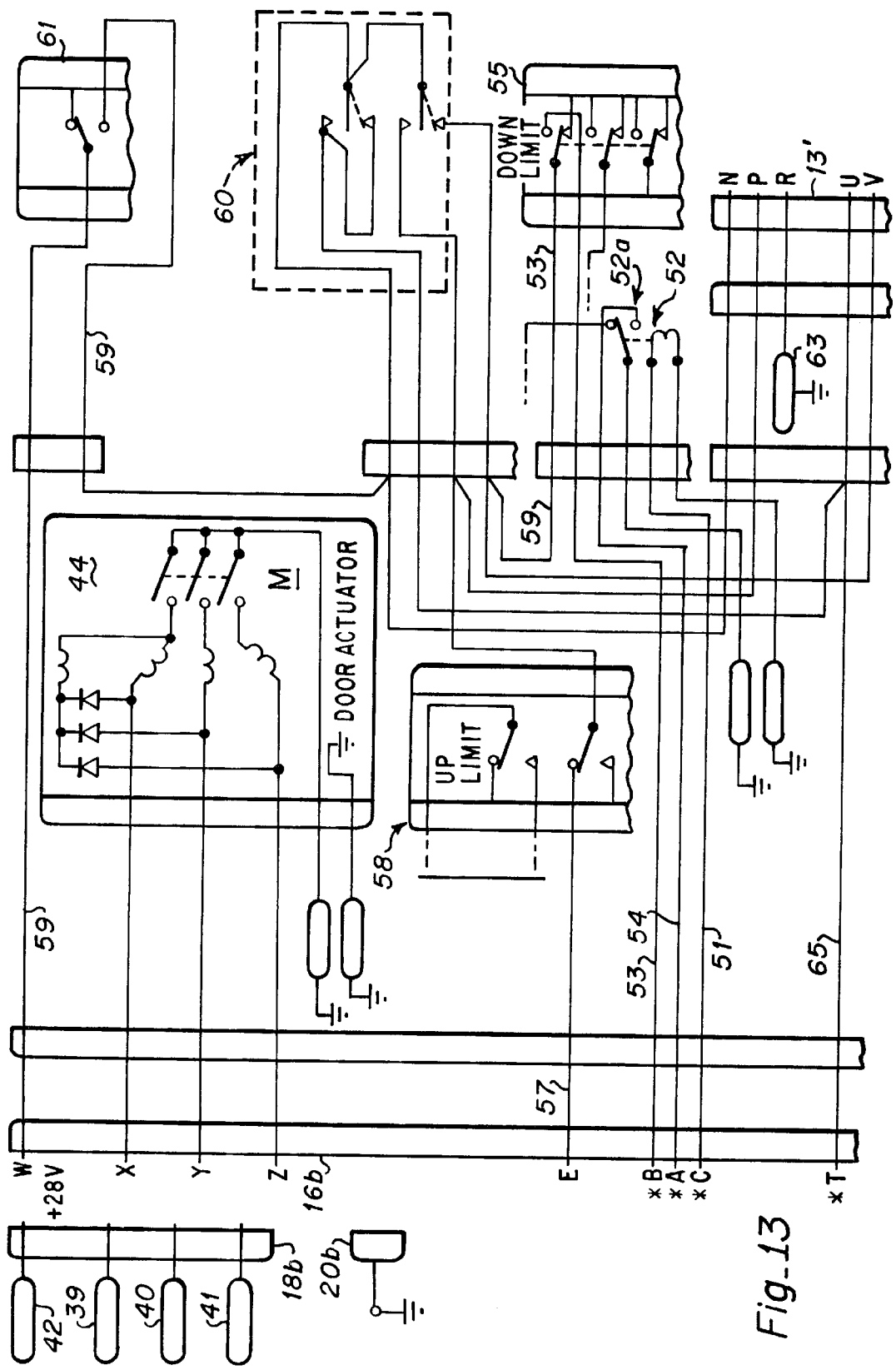
FIG. 13 is a schematic that illustrates the internal aircraft wiring for a passenger door control between the bulkhead connectors and the overhead equipment connectors that is helpful in understanding the operation of the invention.

As illustrated in FIG. 1, the elements for the control set conveniently store in a two part hinged container 1 for portability and convenience of storage. The bottom container portion houses an electrical interconnection or, as variously termed, adaptor cable 13, a control box 3, a strap 27, and an attendant box 5, later herein described in detail. The upper or lid portion of the container houses four interconnecting cables 9A, 9B, 9C, and 11, located behind a hinged barrier flap, shown partially cut away. The foregoing container is a standard equipment case, suitably one in which the hinged top portion or lid swings down atop the lower portion and is locked in place by the latches illustrated. With the container closed, the user may grasp the case handles and carry the packed door control set to the appropriate location on board the aircraft or elsewhere.

Reference is made to FIG. 2 illustrating the attendant box 5 to a larger scale. The attendant box includes handles 6 for gripping, an indicator lamp 8 and a three position toggle or selector switch 10. The switches position can be moved to the "door up" position, the "door down" position, or remain in a neutral position. Lamp 8 is lighted during control set operation when the selector switch is moved to one of the door repositioning positions, so long as and only if the attendant and control box circuits are properly connected.

A cable 13 to allow the attendant box to be connected to the appropriate one of the selected door bulkhead connectors, not illustrated in the figure, extends through a cable strain relief 12 located in the side of the box. The cable is only partially illustrated in this figure, the remainder being illustrated in FIG. 4, discussed hereafter. Cable 13 contains electrical leads that are wired directly to the electrical circuits within the box. That direct wiring avoids the possibility that the cable might be misplaced during service as would render the equipment non-functional. However, in alternative embodiments in which misplacement of the cable is not of concern, then strain relief 12 would be replaced by an appropriate female electrical connector, wired to the internal elements, and a mating male electrical cable connector is wired to the input end of cable 13 shown in FIG. 4. This allows cable 13 to be detached and stowed separately from the attendant box.

FIG. 3 illustrates the control box 3 to larger scale. The control or equipment box serves as the principal interface with the aircraft power supply circuit and contains the electrical circuits to provide the proper sequencing of the aircraft's equipment that is necessary to open or close a door, specifically to unlock and then reposition the door. The box includes a handle 14 located on the top side, electrical cable connectors 16, 18, and 20, exposed on the left side, front handles 22 for face protection, indicator lamps 15, 17, 19, and 21, switch operators for circuit breakers 23, 24, 25, and 28, and selector switch 26.

Each of lamps 15, 17 and 19, respectively, illuminate to indicate availability of electrical power on the respective three electrical lines from the aircraft's three phase AC power supply, that the circuits are properly connected to the aircraft's power supply, and that the associated circuit breakers contained in the control box that protect against electrical overload are properly set to conduct current. Light emitting diode 21 illuminates to indicate that the 28 V DC voltage from the aircraft power supply is also available.

Switch 26 is a two position electrical selector switch with associated decals on the panel to indicate "left" and "right" side door selections. The selector switch is set to the "left" position during the set up procedure if the operator plans to control one of the "left" side doors; and is set to the other position if the operator wishes to control a "right" side doors.

A hooked sling or strap 27, normally stowed in the container of FIG. 1, is shown installed to handle 14. The hooked strap supports the control box in a position suspended from the ceiling frame or rail of the aircraft for use as hereafter described.

Universal adapter cable 13 shown in FIG. 4, attached to the attendant box, contains four output connectors 13B, 13C, 13D and 13E. Cable input clamp 13A connects to connector 12 on attendant box 5 and the leads from that input end of the cable are connected internally to elements within the box as shown in the schematic of FIG. 12, hereafter discussed. The output connectors are schematically illustrated in FIG. 12 as connectors also designated 13B, 13C, 13D and 13E. The cable's internal electrical wiring runs the five electrical leads for each portion to the corresponding connections on each of the four output connectors 13B–13E. The schematic of FIG. 12, later herein discussed in detail, shows each of the five contacts in each of the four output connector portions, 13B–13E, are essentially connected internally within the attendant box to the same circuits and provide parallel outputs for those electrical circuits. However the cable's output connectors are keyed differently so that each connector uniquely fits only one of the four separate unique attendant bulkhead door connectors associated with a corresponding one of four aircraft doors, a typical aircraft safety practice.

As illustrated in FIG. 5 three cables 9A, 9B, and 9C are provided. Cable 9A routes aircraft electrical ground from the aircraft ground connector to the control box for each door selected for operation. Cable 9B routes aircraft power, 28 VDC and 115 VAC, 400 Hz, 3 phase from the aircraft power connector to the control box for each door selected for operation and Cable 9C routes control signals from the control box to the aircraft connector for the door selected for operation. An alternative to cable 9C serving like function, but for other passenger doors, is cable 11, illustrated in FIG. 6, next described.

Additionally, an adapter cable 11, illustrated in FIG. 6, is provided to connect the control box to the overhead panel equipment connector for either right or left side No. 3 aircraft door and contains a single connector at one end and divides to two connectors at the opposite end for selective connection to right or left door overhead equipment panels. In this specific embodiment, the cable contains eighteen leads connected at one end to one connector and those leads are equally distributed to each of the two connectors at the other end.

The invention is described in connection with a MD-11 aircraft, and, specifically, to operation of the number 2 and number 3 right and left side passenger doors. The door control set is used with one door at a time. It is noted that the door control set is not intended for use with the number 1 and 4 doors of that aircraft.

Since the description of operation of the control set is explained in connection with an MD-11 aircraft, a simplified diagram of the left side of an MD-11 aircraft is presented in FIG. 7 which shows the location of the passenger and cargo doors on the aircraft. The approximate positions of the mid cabin or No. 2 left door MCL and over-wing cabin or No. 3 left door OWL and aft cabin door AFL. The corresponding No. 2 and No. 3 right doors are located approximately at the same position on the opposite side of the craft. In freighter configuration cargo is loaded through the upper cargo door UCL and moved on pallets as far to the rear of the plane as possible, continuing with additional pallets typically until the craft is filled with cargo.

FIG. 8 is a simplified illustration of one of those passenger doors within the craft and shows the relative position of the outside door switch 45 located on the crafts exterior and the door bracket holding the bulkhead connectors 46 for the attendant's panel. For operating the door with the control set, the attendant box 5 is connected by universal cable 13 to the appropriate bulkhead connector 46 for that door. The installer selects the one of the four output connectors 13B–13E from the multi-connector end of adapter cable 13, connected to attendant box 5, that fits the unique bulkhead connector for the respective door being selected. Because each of the four doors contains a connector that is unique in mechanical design relative to each of the other such connectors, it is not physically possible for the installer to connect the wrong connector in place. That completes one portion of the preparation for control set operation.

As pictorially depicted in FIGS. 9 and 10, for operation the control box 3 is placed in an elevated position suspended by hooked line 27 from the overhead air conditioning cable rail in the Md-11 aircraft, which is exposed when the ceiling is removed for the freighter configuration. As installed for operation of the No. 2 right and left passenger doors, each of cables 9A, 9B and 9C are connected between the control box and the corresponding right side bulkhead overhead equipment connectors B1, B2 and B3 on bracket 47. For connection to the No. 3 passenger doors, as illustrated in FIG. 10, the cables to the control box are connected to the right side of the plane to overhead connectors C1 and C2 on bracket 48, whereas the remaining connector C3 is located on the right side of the aircraft. Connector C4 for the left side door in the pair is located on bracket 50 on the left side of the aircraft. Hence dual use adapter cable 11 is of a greater length than its counterpart cable 9C, sufficient in length to reach across the width of the craft.

The relation of the foregoing features of the aircraft and the external appearance of the control boxes and its set up within the aircraft gives context to the electrical circuits employed in each of the two control boxes, which are schematically illustrated in FIGS. 11 and 12, which are next considered.

As illustrated in the schematic of FIG. 11, control box 3 contains circuit breakers 23, 24, 25, and 28, the four indicator lamps 15, 17, 19 and 21, electromagnetic relays 33, 35 and 37 and manually operable two position control switch 26, and the three electrical connectors 16, 18, and 20, earlier illustrated. Selector switch 26 contains nine sets of transfer contacts.

Selector switch 26 is a manually operated two position rotary switch that allows the control box to be selectively used with either the right or left aircraft doors. The selector switch contains nine sets of single pole double throw contacts or transfer contacts. The movable switch contact in each contact set remains in contact with the upper one or the other lower one of the two contacts in each respective contact set, depending whether it is manually operated to the upper or lower position, respectively. When manually operated to one position, the switch remains in that position until operated again to the alternative position, where it remains until operated again.

With the control switch set in the position illustrated, in which the switch transfer contacts are set in contact the lower stationary contact in each contact set, the respective electrical leads connected to contacts W, X, Y, Z, E, *B, *A, *C and *T of connector 16, the control box is prepared for use with either of the two doors on the right hand side of the aircraft. If the switch is manually rotated to the alternative position, the control box is prepared for use in controlling either of the two left side doors; the circuits connected through to the other contacts of connector 16, only one of which, S, is labeled.

The three relays are of the electromagnetic type. Relay 35(upper) contains an electromagnetic winding and three sets of make contacts, each with a movable contact and a stationary contact and, when energized, serves to connect the three phase AC lines through to selector switch 26 and connector 16. Relay 33 (lower) is of like structure containing a winding and three sets of make contacts. Relay 37 contains an electromagnetic winding and a set of make contacts 37A.

The elements located within attendant box 5 are best illustrated in the schematic diagram of FIG. 12 to which reference is now made. Selector switch 10, earlier identified, that allows the operator to initiate either a door open or door close operation, contains two sets 29 and 31 of alternate make contacts. The first contact set 29 includes a movable contact, upper make contact and lower make contact. The second contact set 31 contains a movable contact and make contacts, the latter of which are wired electrically in common. The movable contacts are wired to terminal 30-1 of the terminal block 30 and to the first pin of connector 13B, through which it is connected to the 28 VDC source and in parallel to the first contact of each of the other connector portions 13C, 13D and 13E. The moveable contact in each contact set is operable to any of three positions, the neutral position illustrated, a first or "up" position in contact with the upper make contact, and a second or "down" position in contact with the lower make contact.

Since each of the connector portions 13B–13E are associated with a particular one of the four aircraft doors, and the control set is intended to work with only one door at any one time, the description of operation using connector 13B given is representative of the same mode of operation for each of the other connectors and their associated doors and, therefore, need not be repeated. Note also that the electrical leads of cable 13, earlier described, are represented by the leads in the schematic that extend from the various output connectors 13B–13E to terminal block 30.

The movable contacts in the two respective contact sets are normally in the neutral position, out of contact with either make contact. When moved into contact with the upper make contact, a circuit is completed to raise the aircraft door to the open position. Through the associated cable, a 28 volt DC voltage is applied to connector pin 1; and electrical ground is connected to connector pin 5. This places the DC voltage at the movable contacts in each set and at one end of LED lamp. The remaining lead of the LED is connected to electrical ground at connector pin 5 via terminal block 30, completing a current path through the LED. The LED illuminates, indicating that the DC voltage is present and that the circuit is properly hooked up and the aircraft's battery circuits and control box that supplies the DC is functioning.

The particular door is selected by connecting attendant box 5 to a selected bulkhead connector for a door via adaptor cable 13, as was depicted in FIG. 8. For purposes of this description the mid cabin right door of the aircraft is selected.

FIG. 13 is a schematic of the aircraft's electrical circuits for operating the mid-cabin or No. 2 right aircraft door, which is representative of the aircraft's circuits for the mid-cabin left passenger door and the two above wing or No. 3 passenger doors. Specifically, the figure schematically shows those circuit portions or wiring that remains in the aircraft following disassembly and removal of the associated mid-cabin equipment panel, containing the operating switches and other components, and the cabin attendant door control switch panel, both of which are normally found in the passenger configuration.

The foregoing schematic shows the electrical power connector 18B, ground connector 20B and the equipment panel connector 16B, containing the nine pins, W, X, Y, Z, E, *B, *A, *C, and *T, that correspond to the nine contacts of like identity illustrated at connector 16 in the control box 3 in FIG. 11. The foregoing connectors are located in the overhead equipment panel for the two No. 2 doors. Similar connectors are found at the locations for the No. 3 doors. The aircraft wiring also contains connector 12B for connection, via adapter cable 13, to the attendant's selector switch 10 in the attendant box 5. Power connector 18B contains connection to the aircraft's wiring for the 28 volt DC voltage 42, and three electrical leads of the aircrafts three phase 115 volt AC supply 39, 40, and 41.

The Power control and sequencing connector 16B contains circuits connecting the corresponding four electrical supply lines at W, X, Y, and Z, via the associated equipment panel circuits, which was removed, to the 28 volt DC circuit and to the three windings of the three phase AC operator door actuator mechanism 44.

The aircraft wiring schematic also shows for completeness the mid outside door control switch, represented in dash lines 55. That outside control switch is locked closed and as a practical matter is inaccessible for use. Other than to note the presence of that circuit and that it does not interfere with the described operation, it is not material to the present invention and need not be further discussed.

From connector 16B additional leads extend through the aircraft to the attendant panel connector 12B; lead 51 extending to the electromagnetic winding of the door lock pin release solenoid 52 for the associated door; lead 53 to a stationary contact in the door's down limit switch 55; lead 54 to a stationary make contact of contact set 52A on door look pin release relay solenoid 52; and lead 57, via a break contact in the door up limit switch 58, to contact "P" at the attendant's panel connector 12B. Electrical ground potential extends via lead 63 to contact pin R in connector 12B. The purpose of those leads in the foregoing circuit which terminate at the connectors is better understood by referring to the schematics of the control set and attendant's box presented in FIGS. 11 and 12, and will be described in connection with a description of operation.

Returning to the control box schematic of FIG. 11, with connector 18 connected via the appropriate electrical cable to the aircraft's power supply connectors 18B (39 to 42) in FIG. 13, each of the lines for the three phase 115 VAC is connected to one terminal of a respective one of the circuit breakers 23, 24 and 25 and the aircraft's 28 VDC line is connected to an end of circuit breaker 28. The electrical ground connection is established to the control box at connector 20 and is applied to the metal box as a chassis ground or common.

The remaining end of each circuit breakers 23, 24, 25 is connected in parallel to a respective one of the transfer contacts of the three sets of transfer contacts in each of relays 33 and 35. One of those AC lines is also connected to the transfer contact of relay 37. This prepares the control box to apply the 115 VAC to the respective transfer contacts of manual selector switch 26 and from there to a respective contact pins X, Y and Z in connector 16.

The remaining end of the circuit breakers is also connected to an associated one of the indicator lamps 15, 17, 19 and 21, thereby establishing an energizing circuit to the respective lamps. Thus an end of circuit breaker 23 is connected to a terminal of lamp 15; that of breaker 24 is connected to a terminal of lamp 17; that of breaker 25 is connected to lamp 19 and that of breaker 28 is connected to terminal of lamp 21. Lamps 15, 17 and 19 are suitably incandescent lamps and lamp 21 is a light emitting diode, LED.

The remaining end of circuit breaker 28 is directly connected through to the uppermost transfer contact of manual selector switch 26 to extend the 28 VDC to one of the pins "W", of connector 16. That voltage is applied through the aircraft wiring (FIG. 13) to the attendant box 5 (FIG. 12), as elsewhere herein described. The attendant box also accesses electrical ground in the aircraft through connector 12B. The 28 volts DC connected through adapter cable 11 to contact W of connector 16B in the aircraft wiring of FIG. 13, extends via lead 54 through the door power interlock 61, which is in closed circuit, to connector 12B in the top most pin "N". As seen from the attendant box schematic of FIG. 12, this supplies the DC current, via the associated adapter cable, to lamp 8 in attendant box 5, via pin N of connector 12, and the lamp illuminates, confirming the integrity of the door control set's preparation.

With the proper power supply cables thus installed, a current path is established through each of the lamps, and energizes those lamps, which illuminate. The lighted lamps serve to alert the operator that the aircraft electrical supply is operating, the cables are properly installed, the circuit breakers are properly set and the lamps are operative. Should any or all lamps fail to illuminate, the operator is forewarned to find and correct the fault before proceeding.

When the attendant box receives 28 VDC, electrical power is applied to the indicator lamp and the up/down control selector switch 10. The lamp's illumination indicates that power is available to the door control sequencing circuits in the control box. When the manual selector switch 10 is positioned to UP, a 28 VDC lock pin release signal and a door open signal issues from the attendant box. When that control switch is positioned Down, the box outputs a 28 VDC lock pin release signal and a door close signal.

With both the control box 3 and the attendant box thus installed and prepared and assuming the aircraft's passenger doors are closed, selector switch 10 in the attendant box is raised to the up position, in which the movable contacts in contact sets 29 and 31 contact the upper make contacts. This completes a circuit from the DC voltage, through the terminal block 30 to pin P in connector 13B, thereby issuing a command to raise the right mid cabin aircraft door to the open position. Operation of the selector switch also completes a circuit from the DC power supply through the make contact of contact set 31, to contact pin U in connector 13B.

As may be ascertained from FIG. 13, the DC voltage applied at pin U extends the DC voltage through the aircraft wiring via lead 65 to connector 16B pin *T in the overhead equipment panel; and, through the adapter cable 11, extends through the *T pin in connector 16 in control box 3, schematically illustrated in FIG. 7 to which reference is again made. From there, the positive DC voltage is applied to one end of the electromagnetic winding of the lock pin release control relay 37. Since the remaining end of that relay's winding is grounded, a current path is completed through that relay. Relay 37 energizes and closes its make contacts 37a. This applies an AC voltage stemming from circuit breaker 25 to the *C contact of connector 16, which essentially commands the AC lock solenoid 52 in the aircraft to unlock the door.

Returning again to the aircraft wiring of FIG. 13, the AC voltage at *C is applied from connector 16B to an end of the winding of mid door lock pin release solenoid 52 completing a current path through that solenoid to electrical ground. Solenoid 52 is energized and withdraws the lock pin, not illustrated, from the associated passenger door, unlocking the door so that it may thereafter be moved.

The solenoid also closes a set of make contacts 52A. Upon closure of those make contacts, electrical ground is extended thereby via lead 54 to contact *A at connector 16B. Turning again to the control box schematic of FIG. 11, that ground potential is extended via the adapter cable 11 to contact *A in connector 16 and from there extends to one end of each of the electromagnetic windings of both the "down" relay 33 and the "up" relay 35. Application of that ground to the relays, prepares one or the other of those relays for energization as soon as a DC voltage, representing the door open command, is applied to the other end of the winding. Such a DC voltage appears at pin E of connector 16 as next described.

Since the operation being described is to raise and open the door, the further description is relevant to relay 35, and relay 33 remains unoperated during the described door opening operation. However, it should be borne in mind that a like operation occurs for relay 33, during a door closure operation, and, analygously, as those skilled in the art appreciate by inspection of the schematic illustrations, relay 35 remains unoperated during the closing operation.

Returning again briefly to the schematic of the attendant door box of FIG. 12 and the operation of selector switch 10, which completed a circuit from the DC voltage source, through the terminal block 30 to pin P in connector 13B, issuing a command to raise the right mid cabin aircraft door to the open position. That DC voltage is coupled via adapter cable 13 to the P pin of connector 13' in the door bulkhead.

As may also be ascertained from the aircraft wiring in FIG. 13 to which reference is made, the DC voltage at pin P of connector 13' extends through the aircraft's wiring 57, through the contact set in the left mid door up limit switch 58 and from there is applied to the contact E of connector 16B at the overhead equipment panel. That current path is extended through adapter cable 11, earlier described, to control box 3 of the control set, and to one end of the electromagnetic winding of "up" relay 35 in the control box. Essentially the "up" command issued at the attendant box 5 is communicated through the aircraft's wiring to control box 3.

Since the remaining end of the electromagnetic winding of relay 35 was prepared with ground potential by the return of the confirmation from the lock solenoid 52, earlier described, a current path is completed through the relay's winding and energizes that winding. Thus energized, relay 35 operates and closes its make contacts, thereby extending the three leads from the three phase power supply at respective circuit breakers 23, 24, and 25, the contacts of selector switch 26 to pins X, Y and Z of connector 16, and from there, through adapter cable to the corresponding pins X, Y and Z of connector 16B in the overhead equipment panel, illustrated in FIG. 13, to which reference is again made.

As shown in FIG. 13, the three phase AC is applied to the windings of motor 44, symbolically illustrated, and the motor turns its shaft in one direction and raises the selected door. It may be noted that up limit switch 58 is a protective device that interrupts that electrical current path to relay 35 when the door moves too far, thereby terminating the command, and halting further energization of the door motor.

The same essential circuit operation occurs with minor exception when it is desired to lower the door, which those skilled in the art may glean from further inspection of the schematic. Briefly, in the closing operation the same operation of the door lock pin release relay 37 (FIG. 11) operates to energize the lock pin release solenoid 52 (FIG. 13), that in turn issues a confirmation by applying ground to one side of relay 33's winding. Selector switch 10 (FIG. 12) applies DC voltage to pin V in connector 12 portion P1 that extends via lead 53 through a door down limit switch 55, whose contacts are closed at this stage, to the other end of relay 33's winding (FIG. 11). Relay 33 in turn closes the AC power to the three phase motor windings M (FIG. 13), but with the leads to the AC reversed or interchanged to reverse the AC polarity to the motor from that which occurring during the earlier described operation in which relay 35 operated to supply the AC. With the change in polarity, as is conventional to operation of three phase AC motor, the motor turns in the opposite direction than before, to lower the door.

It is believed that the foregoing description of the preferred embodiments of the invention is sufficient in detail to enable one skilled in the art to make and use the invention. However, it is expressly understood that the detail of the elements presented for the foregoing purpose is not intended to limit the scope of the invention, in as much as equivalents to those elements and other modifications thereof, all of which come within the scope of the invention, will become apparent to those skilled in the art upon reading this specification. Thus the invention is to be broadly construed within the full scope of the appended claims.

What is claimed is:

1. A door control apparatus for controlling the positioning of locked electrically controlled doors of a reconfigurable aircraft that is in a freighter configuration, said aircraft containing at least one right side door and at least one left side door and an electrical operated door motor mechanism associated with each said door for positioning the associated door, and wherein said apparatus comprises:

a first control unit in electrical connection with said electrical operated door motor mechanism, wherein said first control unit includes a first multi-position selector switch for selecting one of the right side and left side doors for repositioning movement; and a second control unit remote from and in communication with said first control unit for providing positional control input to said first control unit for positioning of said doors, wherein said second control unit comprises a second multi-position selector switch having a neutral position, first position and second position, said second multi-position switch capable of issuing a command to said first control unit for opening a door in response to movement of said selector switch to a first position, and further capable of issuing a command to said first control unit for closing said door in response to movement of said selector switch to a second position.

2. An apparatus according to claim 1 wherein said second control unit further comprises a circuit for enabling said second multi-position selector switch to issue the command for repositioning a door only when said first control unit is connected with said electrical operated door motor mechanism.

3. An apparatus according to claim 1 wherein said first control unit comprises a third electrical switch for issuing a lock pin release command to a solenoid of said electrical operated door motor mechanism for unlocking of said door.

4. A door control apparatus for controllably positioning a door of a reconfigurable aircraft, wherein the aircraft includes an electro-mechanical system that controllably positions said door and that is at least partially disconnected for reconfiguration of the aircraft, and wherein said apparatus comprises:

a first control unit for at least partially reconnecting the electromechanical system associated with said door that was disconnected during reconfiguration; and a second control unit, remote from said first control unit, for providing positional control input to said first control unit via an input port near said door such that said door can be appropriately positioned in response to the positional control input.

5. An apparatus according to claim 4 wherein the electro-mechanical system controllably positions a plurality of doors that are positioned on opposing sides of said aircraft, and wherein said first control unit comprises a first selector switch for operatively configuring said apparatus to control doors on one of said opposing sides of said aircraft.

6. An apparatus according to claim 4 wherein said first control unit is in electrical connection with a power supply of said aircraft.

7. An apparatus according to claim 6 wherein said first control unit further comprises a first power indicator for indicating when said first control unit is in electrical connection with said power supply.

8. An apparatus according to claim 4 wherein said second control unit further comprises a second selector switch for selectively providing positional control input to said first control unit for positioning of said door.

9. An apparatus according to claim 8 wherein said second selector switch defines a-plurality of switch positions, wherein a first switch position provides input to said first control unit to at least partially open said door, and wherein a second switch position provides input to said first control unit to at least partially close said door.

10. An apparatus according to claim 4 wherein said second control unit further comprises a second indicator for indicating when said first control unit has at least partially reconnected said electro-mechanical system.

11. An apparatus according to claim 9 wherein said door comprises a locking system for locking the aircraft door, and wherein said first and second control units and said electro-mechanical system cooperate to controllably release said locking system of said door in response to movement of said second selector switch of said second control unit to either the first or second position.

12. A door control apparatus for controllably positioning a door of a reconfigurable aircraft, wherein the aircraft includes an electro-mechanical system that controllably positions said door and that is at least partially disconnected during reconfiguration of the aircraft, and wherein said apparatus comprises a first portable control unit, mounted within the reconfigured aircraft, for at least partially reconnecting the electro-mechanical system, to permit said door to be controllably positioned following reconfiguration of the aircraft.

13. An apparatus according to claim 12 wherein the electro-mechanical system controllably positions a plurality of doors that are positioned on opposing sides of said aircraft, and wherein said first control unit comprises a first selector switch for operatively configuring said apparatus to control doors on one of said opposing sides of said aircraft.

14. A door control apparatus for controllably positioning a door of a reconfigurable aircraft, wherein the aircraft includes an electro-mechanical system that controllably positions said door and that is at least partially disconnected during reconfiguration of the aircraft, and wherein said apparatus comprises a portable attendant control unit for at least partially reconnecting the electro-mechanical system associated with said door that was disconnected during reconfiguration, wherein said portable attendant control unit provides positional control input to said electro-mechanical system via an input port near said door such that said door can be appropriately positioned in response to the positional control input.

15. An apparatus according to claim 14 wherein said portable attendant control unit further comprises a selector switch for selectively providing positional control input to said electromechanical system for positioning of said door.

16. An apparatus according to claim 15 wherein said selector switch defines a plurality of switch positions, wherein a first switch position provides input to said electro-mechanical system to at least partially open said door, and wherein a second switch position provides input to said electromechanical system to at least partially close said door.

* * * * *

UNITED STATES PATENT AND TRADEMARK OFFICE
CERTIFICATE OF CORRECTION

PATENT NO. : 5,881,973
DATED : March 16, 1999
INVENTOR(S) : Agajanian et al.

It is certified that error appears in the above-identified patent and that said Letters Patent is hereby corrected as shown below:

On the title page, Item [56],

In the References Cited, U.S. PATENT DOCUMENTS, line 10, "Hermann et al." should read --Herrmann et al.--; delete line 11, "5,421,531  6/1995  Carducci.".

Column 13, line 4, "a-plurality" should read --a plurality--.

Column 14, line 17, after "input" insert --by said portable control unit--; lines 21 and 27, "electromechanical", each occurrence, should read --electro-mechanical--.

Signed and Sealed this

Thirteenth Day of July, 1999

Attest:

Q. TODD DICKINSON

*Attesting Officer*   *Acting Commissioner of Patents and Trademarks*